(12) United States Patent
Burton et al.

(10) Patent No.: US 10,899,971 B2
(45) Date of Patent: Jan. 26, 2021

(54) STABILIZATION OF ZEOLITE BETA FOR FCC PROCESSES

(71) Applicant: ExxonMobil Research and Engineering Company, Annandale, NJ (US)

(72) Inventors: Allen W. Burton, Stewartsville, NJ (US); Scott J. Weigel, Allentown, PA (US); Mobae Afeworki, Phillipsburg, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 16/274,558

(22) Filed: Feb. 13, 2019

(65) Prior Publication Data
US 2020/0255747 A1  Aug. 13, 2020

(51) Int. Cl.
*C10G 11/05* (2006.01)
*B01J 29/70* (2006.01)
(Continued)

(52) U.S. Cl.
CPC .......... *C10G 11/05* (2013.01); *B01J 29/7007* (2013.01); *B01J 29/7057* (2013.01); *B01J 29/83* (2013.01); *B01J 29/85* (2013.01); *B01J 29/90* (2013.01); *C01B 39/026* (2013.01); *C10G 11/187* (2013.01); *B01J 35/1019* (2013.01); *B01J 35/1023* (2013.01); *B01J 35/1038* (2013.01); *B01J 2229/186* (2013.01);
(Continued)

(58) Field of Classification Search
None
See application file for complete search history.

(56) References Cited

U.S. PATENT DOCUMENTS 3,354,078 A  11/1967  Miale et al.
3,702,886 A  11/1972  Argauer et al.
(Continued)

FOREIGN PATENT DOCUMENTS

CN       1209356 A    3/1999
CN      101249968 A   8/2008
(Continued)

OTHER PUBLICATIONS

Iwasaki et al., "Hydrothermal stability enhancement by sequential ion-exchange of rare earth metals on Fe/BEA zeolites used as NO reduction catalysts", Chem. Commun., 2011, 47, 3966-3968.
(Continued)

*Primary Examiner* — Derek N Mueller
(74) *Attorney, Agent, or Firm* — Hsin Lin (57) ABSTRACT

Methods are provided for performing fluid catalytic cracking (and/or other hydrothermal processing for cracking of hydrocarbons) on a feedstock containing hydrocarbons in the presence of a catalyst that includes zeolite Beta that is stabilized toward hydrothermal conditions. The hydrothermally stabilized zeolite Beta (including any of the various polymorphs) corresponds to zeolite Beta that is formed without the use of an organic structure directing agent, and that is further stabilized by addition of one or more stabilizers, such as lanthanide series elements or phosphorus.

18 Claims, 6 Drawing Sheets

(51) Int. Cl.
    *B01J 29/83* (2006.01)
    *B01J 29/85* (2006.01)
    *B01J 29/90* (2006.01)
    *C01B 39/02* (2006.01)
    *C10G 11/18* (2006.01)
    *B01J 35/10* (2006.01)

(52) U.S. Cl.
    CPC ........ *B01J 2229/24* (2013.01); *B01J 2229/36* (2013.01); *C01P 2002/72* (2013.01); *C01P 2002/86* (2013.01); *C10G 2300/70* (2013.01)

(56) References Cited

U.S. PATENT DOCUMENTS

| | | | |
|---|---|---|---|
| 3,709,979 | A | 1/1973 | Chu |
| 3,770,614 | A | 11/1973 | Graven |
| 3,832,449 | A | 8/1974 | Rosinski et al. |
| 3,948,758 | A | 4/1976 | Bonacci et al. |
| 4,016,245 | A | 4/1977 | Plank et al. |
| 4,076,842 | A | 2/1978 | Plank et al. |
| 4,229,424 | A | 10/1980 | Kokotailo |
| 4,254,297 | A | 3/1981 | Frenken et al. |
| 4,310,440 | A | 1/1982 | Wilson et al. |
| 4,440,871 | A | 4/1984 | Lok et al. |
| 4,500,651 | A | 2/1985 | Lok et al. |
| 4,686,029 | A | 8/1987 | Pellet et al. |
| 4,837,396 | A * | 6/1989 | Herbst ............ B01J 29/7007 502/64 |
| 5,457,078 | A | 10/1995 | Absil et al. |
| 5,472,922 | A * | 12/1995 | Degnan ............ B01J 29/7007 208/114 |
| 5,833,840 | A | 11/1998 | Absil et al. |
| 8,716,163 | B2 | 5/2014 | Liu et al. |
| 8,865,121 | B2 | 10/2014 | Xiao et al. |
| 8,900,445 | B2 | 12/2014 | Xie et al. |
| 9,227,181 | B2 | 1/2016 | Harris |
| 9,238,219 | B2 | 1/2016 | Kubota et al. |
| 2003/0166453 | A1 | 9/2003 | Kuvettu et al. |
| 2003/0173254 | A1 | 9/2003 | Chen et al. |
| 2010/0322847 | A1 | 12/2010 | Xiao et al. |
| 2013/0066131 | A1 | 3/2013 | Harris |
| 2014/0322126 | A1 | 10/2014 | Kubota et al. |
| 2015/0298983 | A1 | 10/2015 | Maurer et al. |
| 2018/0022612 | A1 | 1/2018 | Itabashi et al. |

FOREIGN PATENT DOCUMENTS

| | | |
|---|---|---|
| CN | 102049290 A | 5/2011 |
| CN | 102180478 A | 9/2011 |
| CN | 102285667 A | 12/2011 |
| CN | 103787358 A | 5/2014 |
| CN | 103787359 A | 5/2014 |
| CN | 104649290 A | 5/2015 |

OTHER PUBLICATIONS

Jia et al., "Comparison of conventional and solid-state ion exchange procedures for the incorporation of lanthanum in H-beta zeolite", Microporous and Mesoporous Materials, 1998, 24, 69-82.

Kubota et al., "Effective Fabrication of Catalysts from Large-Pore, Multidimensional Zeolites Synthesized without Using Organic Structure-Directing Agents", Chem. Mater, 2014, 26, 1250-1259.

Wang et al., "Selective Production of Light Olefins from Catalytic Cracking of n-Hexane over OSDA-Free Beta Zeolites", Catal. Surv. Asia, 2016, 20, 1-12.

Zhu et al., "Fe-doped Beta zeolite from organotemplate-free synthesis for NH3-SCR of NOx", Catal. Sci. Technol., 2016, 6, 6581-6592.

Xie et al., "Beta-zeolite modified by phosphorous as FCC catalyst additive", [abstract taken from Petrochemical Technology. 2002, 31(9):691-695]. Petrochemical Technology. 2002, 31(9):691-695.

Xie et al., "Effect of relative crystallinity and Na2O content in zeolite-beta on catalytic performance of fluid catalytic cracking catalyst", [abstract take from Journal of the University of Petroleum. 2003, 27:101-104]. Journal of the University of Petroleum. 2003, 27:101-104.

Zhao et al., "Effect of modified beta zeolite with rare earth on fluid catalytic cracking catalysts", [abstract taken from Journal of the University of Petroleum, China (Natural Sciences Division). 2004, 28(4):112-115]. Journal of the University of Petroleum, China (Natural Sciences Division). 2004, 28(4):112-115.

Zhao et al., "Study on application of beta zeolite in cracking catalyst ", [abstract taken from Chinese Journal of Catalysis). 2002, 23(1):63-68]. Chinese Journal of Catalysis). 2002, 23(1):63-68.

Olson et al., "Chemical and physical properties of the ZSM-5 substitutional series", Journal of Catalysis, vol. 61, 1980, p. 390.

Miale et al., "Catalysis by crystalline aluminosilicates: IV. Attainable catalytic cracking rate constants, and superactivity", Journal of Catalysis, vol. 6, 1966, p. 278.

Weisz et al., "Superactive crystalline aluminosilicate hydrocarbon catalysts", Journal of Catalysis, vol. 4, 1965, p. 527.

Pang et al., "Study on the zeolite beta based octane promoter and its application in heavy oil catalytic cracking", ACS National Book of Abstracts; American Chemical Society—245th ACS National Meeting and Exposition (2013) pp. 973-974.

The International Search Report and Written Opinion of PCT/US2020/013810 dated May 28, 2020.

* cited by examiner

STABILIZATION OF ZEOLITE BETA FOR FCC PROCESSES

FIELD

Methods are provided for using modified zeolite Beta in hydrothermal processing environments, such as fluid catalytic cracking. Corresponding modified zeolite Beta compositions are also provided.

BACKGROUND

Fluid catalytic cracking is a commonly used process within a refinery setting for conversion of challenged heavy feeds to lower boiling fuel products. One difficulty with fluid catalytic cracking (FCC) processes is the relatively harsh reaction environment for the catalyst. During the cracking process, coke accumulates on the catalyst at a relatively rapid rate. The coke can be removed by regeneration, but such regeneration results in exposure of the catalyst to steam at elevated temperatures of 550° C. or higher. Many types of catalysts that include zeolitic frameworks suffer from degradation under such hydrothermal conditions.

Zeolite Beta is an aluminosilicate zeolite with a disordered framework. One ordered end-member of this intergrowth family has the BEA* framework structure. The BEA* framework structure has a 12-ring pore channel as the largest pore channel, and the pore network corresponds to a 3-dimensional pore network. More generally, all polymorphs of zeolite Beta possess a 3D system of 12-ring pores. Traditionally, zeolite Beta was synthesized using an appropriate organic structure directing agent.

More recently, methods have identified to allow synthesis of zeolite Beta without the use of an organic structure directing agent. Examples of zeolite Beta synthesized without the use of an organic structure directing agent can be found, for example, in U.S. Pat. Nos. 9,238,219 or 8,865,121. Such template-free synthesis methods, for example, had increased suitability for production of zeolite Beta with lower ratios of Si to Al in the framework structure.

What is needed is a method to provide zeolite Beta compositions that have sufficient stability under hydrothermal conditions to allow for use in a reaction environments such as fluid catalytic cracking environments.

SUMMARY OF THE INVENTION

In various aspects, a method is provided for performing cracking of hydrocarbons under hydrothermal processing conditions. The method can include contacting a feed that includes hydrocarbons with a catalyst under hydrothermal processing conditions to form a process effluent. The hydrothermal processing conditions can include exposing the feed to the catalyst at a temperature of 475° C. or more in the presence of steam. The catalyst can include hydrothermally stabilized zeolite Beta that has been modified with 0.5 wt % or more of a lanthanide series element, phosphorus, or a combination thereof. For example, the hydrothermally stabilized zeolite Beta can be modified with 1.0 wt % to 15 wt % of lanthanum and/or a lanthanide series element. The hydrothermally stabilized zeolite Beta can correspond to zeolite Beta formed without the use of an organic structure directing agent, such as zeolite Beta formed using seed crystals.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, methods are provided for performing fluid catalytic cracking (and/or other hydrothermal processing for cracking of hydrocarbons) on a feedstock containing hydrocarbons in the presence of a catalyst that includes zeolite Beta that is stabilized toward hydrothermal conditions. In this discussion, zeolite Beta that is stabilized toward hydrothermal conditions is referred to as hydrothermally stabilized zeolite Beta. The hydrothermally stabilized zeolite Beta (including any of the various polymorphs) is defined as a) a zeolite Beta crystalline framework that is formed without the use of an organic structure directing agent, and b) that is further stabilized by addition of one or more stabilizers. In some aspects, the catalyst including zeolite Beta can be hydrothermally stabilized by addition of lanthanum and/or a lanthanide series element to the zeolite Beta as a stabilizer. Additionally or alternately, the catalyst including zeolite Beta can be hydrothermally stabilized by addition of phosphorus to the zeolite Beta as a stabilizer.

Conventionally, some efforts have been made to use phosphorus to stabilize the structure of conventional zeolite Beta made with a structure directing agent. However, even after such stabilization, the zeolite Beta formed using an organic structure directing agent had insufficient structural stability in hydrothermal processing environments to be commercially valuable. Fluid catalytic cracking represents a hydrothermal processing environment based on the presence of elevated temperatures, such as 475° C. to 550° C., along with the presence of steam, which can correspond to up to 5 vol % of the gas phase environment.

It has been unexpectedly discovered, however, that zeolite Beta formed without using an organic structure directing agent has improved structural stability under hydrothermal processing conditions. This is unexpected in part due to the higher alumina content of zeolite Beta when formed with seed crystals instead of an organic structure directing agent. Conventionally, it would be expected that increasing the alumina content of a zeolitic framework structure would lead to reduced hydrothermal stability. Without being bound by any particular theory, it is believed that forming the framework structure for zeolite Beta (including any of its polymorphs) without using an organic structure directing agent can reduce or minimize defects in the framework structure. The reduction in the number of defects can result in improved hydrothermal stability, even with higher alumina content in the framework structure.

By itself, the increased hydrothermal stability of zeolite Beta framework materials when formed with seed crystals is still not sufficient for sustained use in a fluid catalytic cracking environment. However, it has been further unexpectedly discovered that modification of the zeolite beta with additional metals as stabilizers can improve the structural stability.

The amount of modification can be dependent on the modification. For example, for modification of a catalyst with lanthanum, the amount of La added to the catalyst can correspond to 1.0 wt % to 15 wt % of the catalyst, or 5.0 wt % to 15 wt %. For modification with phosphorus, the amount of P added to the catalyst can correspond to 0.5 wt % to 3.0 wt %. In addition to La, it is believed that other lanthanide series elements (i.e., the rare earth elements) can similarly serve as stabilizer metals.

In some aspects, such as aspects where La or other lanthanide series elements correspond to at least a portion of the stabilizer, the benefits of increased hydrothermal stability can be characterized using $^{27}$Al-NMR to determine the percentage of aluminum atoms that are in tetrahedral positions (in the zeotype framework) versus aluminum atoms that are in non-tetrahedral positions. For stabilization with lanthanum (and/or other lanthanide series metals), this increased structural stability can be observed based on the amount of aluminum that remains in tetrahedral sites after exposure of the catalyst to hydrothermal processing conditions. For example, the amount of aluminum that remains in tetrahedral sites can be characterized after exposure of the catalyst to hydrothermal processing conditions for a period of 24 hours or more. In such aspects, the hydrothermal processing conditions can include exposure to steam at a temperature of 475° C. or more for the specified time period.

Additionally or alternately, the increased hydrothermal stability benefits due to inclusion of a stabilizer metal can be observed based on various activity measures for a catalyst. Examples of such activity measures can include, but are not limited to, the Alpha value of a catalyst, the surface area of a catalyst (as measured by BET), and/or the micropore volume of a catalyst.

In this discussion and the claims below, zeolite Beta can refer to both aluminosilicates having a zeolite Beta framework structure, as well as various polymorphs, including polymorphs where heteroatoms other than Si and Al are included in the framework structure. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework.

In this discussion, reference is made to the ring size of the pore channels of a material having a zeolite Beta framework structure. One option for characterizing the ring size is based on the number of atoms in the ring structure that defines the largest pore channel in the zeotype framework structure. For example, a material having a zeolite Beta framework type includes 12-ring pore channels as the largest pore channels.

Alpha value is a measure of the acid activity of a zeolite catalyst as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. Higher alpha values correspond with a more active cracking catalyst.

Fluid Catalytic Cracking with Modified Zeolite Beta Framework Materials

Prior to roughly 2009, successful production of commercially suitable zeolite Beta required use of an organic structure directing agent. Unfortunately, zeolite Beta made with an organic structure directing agent appears to have a sufficient amount of defects in the framework structure so that the resulting catalyst made from such zeolite Beta has reduced hydrothermal stability.

Zeolite Beta made using seed crystals instead of an organic structure directing agent is now commercially available. However, as produced, such zeolite Beta crystals can still have insufficient structural stability to be suitable for use in FCC processing. To further enhance the stability of zeolite Beta (including the various polymorphs), the structure of the zeolite Beta can be modified by adding lanthanum, aluminum, or phosphorus to the structure. Ion exchange is an example of a suitable method to modify the structure of a zeolite Beta material.

After modification, the zeolite Beta material can be used as a catalyst for FCC processing of a feedstock. Suitable feed streams for processing in an FCC reactor can include, but are not limited to, feeds boiling in the range of about 430° F. to about 1050° F. (~221° C. to ~566° C.), such as gas oils, heavy hydrocarbon oils comprising materials boiling above 1050° F. (~566° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes; catalytic slurry oils from an FCC process; and mixtures thereof. The FCC feed may comprise recycled hydrocarbons, such as light or heavy cycle oils.

An example of a suitable reactor for performing an FCC process can be a riser reactor. Within the reactor riser, the FCC feedstream can be contacted with a catalytic cracking catalyst under cracking conditions thereby resulting in spent catalyst particles containing carbon deposited thereon and a lower boiling product stream. The cracking conditions can typically include: temperatures from about 900° F. to about 1060° F. (~482° C. to ~571° C.), or about 950° F. to about 1040° F. (~510° C. to ~560° C.); hydrocarbon partial pressures from about 10 to 50 psia (~70-350 kPa-a), or from about 20 to 40 psia (~140-280 kPa-a); and a catalyst to feed (wt/wt) ratio from about 3 to 8, or about 5 to 6, where the catalyst weight can correspond to total weight of the catalyst composite. Steam may be concurrently introduced with the feed into the reaction zone. The steam may comprise up to about 5 wt % of the feed. In some aspects, the FCC feed residence time in the reaction zone can be less than about 5 seconds, or from about 3 to 5 seconds, or from about 2 to 3 seconds.

In some aspects, the FCC can be operated at low temperature, high conversion conditions. During low temperature operation, the FCC unit can be operated at a temperature from about 850° F. (~454° C.) to about 950° F. (~510° C.), or about 850° F. (~454° C.) to about 920° F. (~493° C.), or about 850° F. (~454° C.) to about 900° F. (~482° C.); hydrocarbon partial pressures from about 10 to 50 psia (~70-350 kPa-a), or from about 20 to 40 psia (~140-280 kPa-a); and a catalyst to feed (wt/wt) ratio from about 3 to 8, or about 5 to 6, where the catalyst weight can correspond to total weight of the catalyst composite. Steam may be concurrently introduced with the feed into the reaction zone. The steam may comprise up to about 5 wt % of the feed. The residence time for the input feed can be from about 2 seconds to about 8 seconds, or about 4 seconds to about 8 seconds, or about 4 seconds to about 6 seconds.

In various aspects, at least a portion of the catalyst used in the fluid catalytic cracking (FCC) reactor can correspond to a modified zeolite Beta material formed without using an organic template, such as modified zeolite Beta formed using seed crystals. The modified zeolite Beta material can be used alone, or in conjunction with one or more other conventional FCC catalysts. Optionally, the modified zeolite Beta material can be combined with a binder to form a bound catalyst. Any convenient binder described herein can be used. Alternatively, the modified zeolite Beta material can be formulated into a catalyst without the use of a separate binder.

Other catalysts suitable for use within the FCC reactor herein can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.7 nm which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (ALPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts which include large-pore zeolites such as USY (Ultra Stable Y) or REY (Rare Earth Y). Additional large pore molecular sieves that can be employed in accordance with the present invention include both natural and synthetic large pore zeolites. Non-limiting examples of natural large-pore zeolites include gmelinite, faujasite, offretite, and mordenite. In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix can be made from an inorganic oxide sol or gel which can be dried to "glue" the catalyst components together. Preferably, the inorganic oxide matrix can be comprised of oxides of silicon and aluminum. It can be preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts be present in the same or different catalyst particles, in the aforesaid inorganic oxide matrix.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from about 1200° F. to about 1400° F. (~649 to 760° C.). The majority of, and preferably substantially all of the hot regenerated catalyst particles can then be recycled to the FCC reaction zone where they contact injected FCC feed.

Comparative Example 1—Activity of Steamed Conventional Zeolite Beta

Conventional zeolite Beta that was formed using an organic structure directing agent was formulated into binder-free and bound catalysts. The catalysts were then characterized after various calcination and steaming treatments to determine the Alpha value and the amount of aluminum retained in the catalyst (as determined by X-ray diffraction).

Sample 1a corresponds to the bound and binder-free catalysts as formed, with only a calcination at 250° C. to provide sufficient stability for testing. Sample 1b corresponds to the bound and binder-free catalysts after steaming at 760° C. for four hours. Sample 1c corresponds to calcination of fresh catalyst at 800° C., while sample 1d corresponds to calcination at 800° C. followed by steaming at 760° C. for four hours. Similarly, sample 1e corresponds to calcination of fresh catalyst at 900° C., while sample 1f corresponds to calcination at 900° C. followed by steaming at 760° C. for four hours.

Table 1 shows the Alpha value and the crystallinity retention (as estimated by X-ray diffraction from the integrated peak intensity) for the various samples. As shown in Table 1, exposure of either the binder-free or bound catalyst to steaming at 760° C. results in loss of 25% or more of crystallinity. Exposure of the catalyst to still higher temperatures results in further loss of crystallinity. The loss in crystallinity is accompanied by a corresponding reduction in Alpha value. Generally, the values in Table 1 show a substantial degradation of the catalyst, indicating a catalyst with low stability in a hydrothermal processing environment. While the FCC processing environment is typically at temperatures less than 600° C., it is believed that steaming at 760° C. is representative of exposure to FCC type conditions for a longer time period. Similarly, the calcinations at 800° C. or 900° C. are believed to be representative of exposure to regeneration conditions over a period of time.

TABLE 1

Steaming and Calcination of Conventional Beta

| | Unbound Beta | | With Silica-Alumina Binder | |
|---|---|---|---|---|
| | Alpha | Crystalline Al retention | Alpha | Crystalline Al retention |
| a. Fresh | 366 | 100 | 276 | 100 |
| b. Steamed (760° C.) | 3 | 74 | 2 | 65 |
| c. Calcined (800° C.) | 43 | 76 | 14 | 76 |
| d. Calcined (800° C.) plus steamed (760° C.) | 3 | 60 | 2 | 69 |
| e. Calcined (900° C.) | 7 | 55 | 3 | 45 |
| f. Calcined (900° C.) plus steamed (760° C.) | 3 | 56 | 2 | 39 |

The potential stabilization of conventional Beta zeolite with phosphorus was also investigated. Table 2 shows alpha values for three types of conventional zeolite Beta (formed using organic structure directing agent) after steaming at 568° C. for various periods of time. Sample 2g corresponds to zeolite Beta with no added phosphorus (0%) that was calcined at 1000° F. (~538° C.) for 3 hours prior to exposure to the steaming at 568° C. Sample 2h includes 1.0 wt % phosphorus, and was calcined at ~538° C. for 3 hours prior to steaming. Sample 2i also includes 1.0 wt % phosphorus, but sample 2i was calcined at ~538° C. for 10 hours.

TABLE 2

Alpha values of Steamed (Phosphorus Modified) Conventional Beta Zeolite Samples

| Hours on Steam | Sample 2g | Sample 2h | Sample 2i |
|---|---|---|---|
| 0 | 452 | 440 | 552 |
| 2 | 150 | 190 | 224 |
| 5 | 79 | 121 | 188 |
| 10 | 44 | 139 | 177 |
| 24 | 29 | 80 | 144 |

As shown in Table 2, adding phosphorus to the zeolite Beta mitigated some of the loss of Alpha value for samples exposed to increasing amounts of steaming at 568° C. However, all of the samples still showed a substantial drop in Alpha value after only 2 hours of exposure to the steaming conditions, and the Alpha value continued to decrease with additional steaming. It is noted that the conditions used to generate the data in Table 2 roughly correspond to conditions that might be expected in an FCC processing environment. Thus, the continued loss of Alpha value during exposure to steam for up to 24 hours indicates the lack of stability of the conventional Beta samples.

Comparative Example 2—Stability of Zeolite Beta Formed without Organic Structure Directing Agent Zeolite Beta crystals formed without the use of an organic structure directing agent were characterized after steaming at various temperatures ranging from 371° C. to 850° C. For each test condition, roughly 4 grams of zeolite Beta was pelletized and loaded into a vertical quartz-tube reactor. The zeolite was then heated at 5° C. per minute to reach the desired temperature. During the initial heating, the zeolite was heated under a flow of nitrogen gas. After reaching the desired temperature, water was dripped from the top of the reactor into the heated bed at a rate of roughly 5 cm$^3$ per hour. The steaming was continued for 16 hours. The steamed zeolite was then cooled. The steamed zeolite samples were characterized using $^{27}$Al-NMR and powder X-ray diffraction. The steamed zeolite samples were also characterized using the Alpha test and nitrogen physisorption (Brunauer-Emmett-Teller characterization for surface area and micropore volume, such as according to the relevant ASTM standard method).

Figure 1:
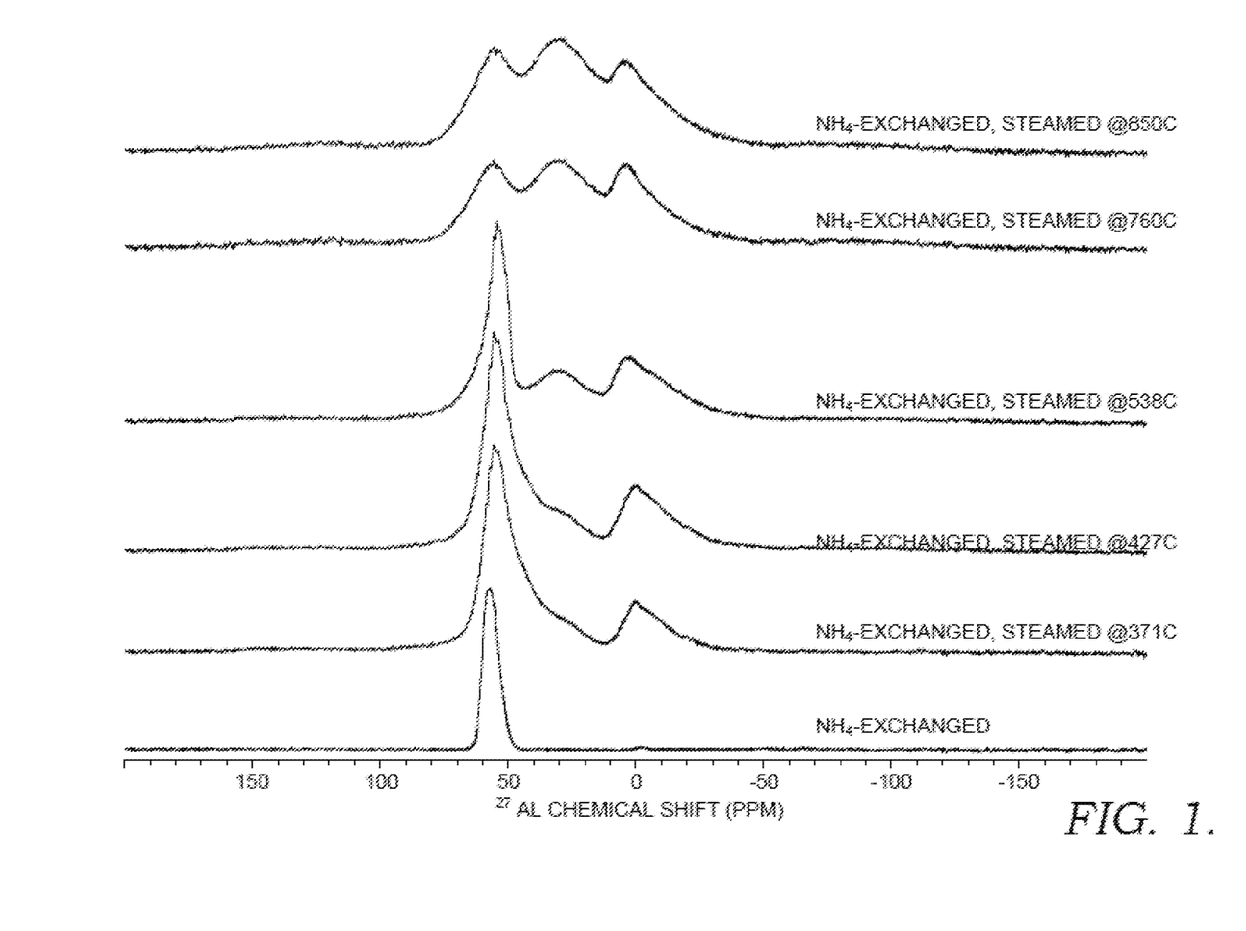
FIG. 1 shows $^{27}$Al-NMR data for zeolite Beta samples formed without use of a structure directing agent after various types of steaming.

FIG. 1 shows the $^{27}$Al-NMR spectra for the zeolite Beta samples after steaming for 16 hours at temperatures of 371° C., 427° C., 538° C., 760° C., and 850° C. As shown in FIG. 1, at the lowest steaming temperature of 371° C., a substantial octahedral alumina peak was present at roughly 0 ppm, indicating the presence of a substantial amount of non-tetrahedral aluminum. An additional pentahedral alumina peak also became apparent at 538° C. Between about 427° C. and 538° C., it appeared that roughly 50% of the aluminum in the sample had become non-tetrahedral (i.e., no longer part of the crystalline framework). At 760° C. and 850° C., a large majority of the aluminum corresponds to non-tetrahedral (i.e., non-framework) aluminum. Based on the series of $^{27}$Al-NMR plots shown in FIG. 1, steaming of the zeolite Beta sample resulted in degradation of the crystalline framework structure. This degradation included substantial conversion of tetrahedral aluminum to non-tetrahedral aluminum, with higher temperature steaming resulting in more severe degradation.

Figure 2:
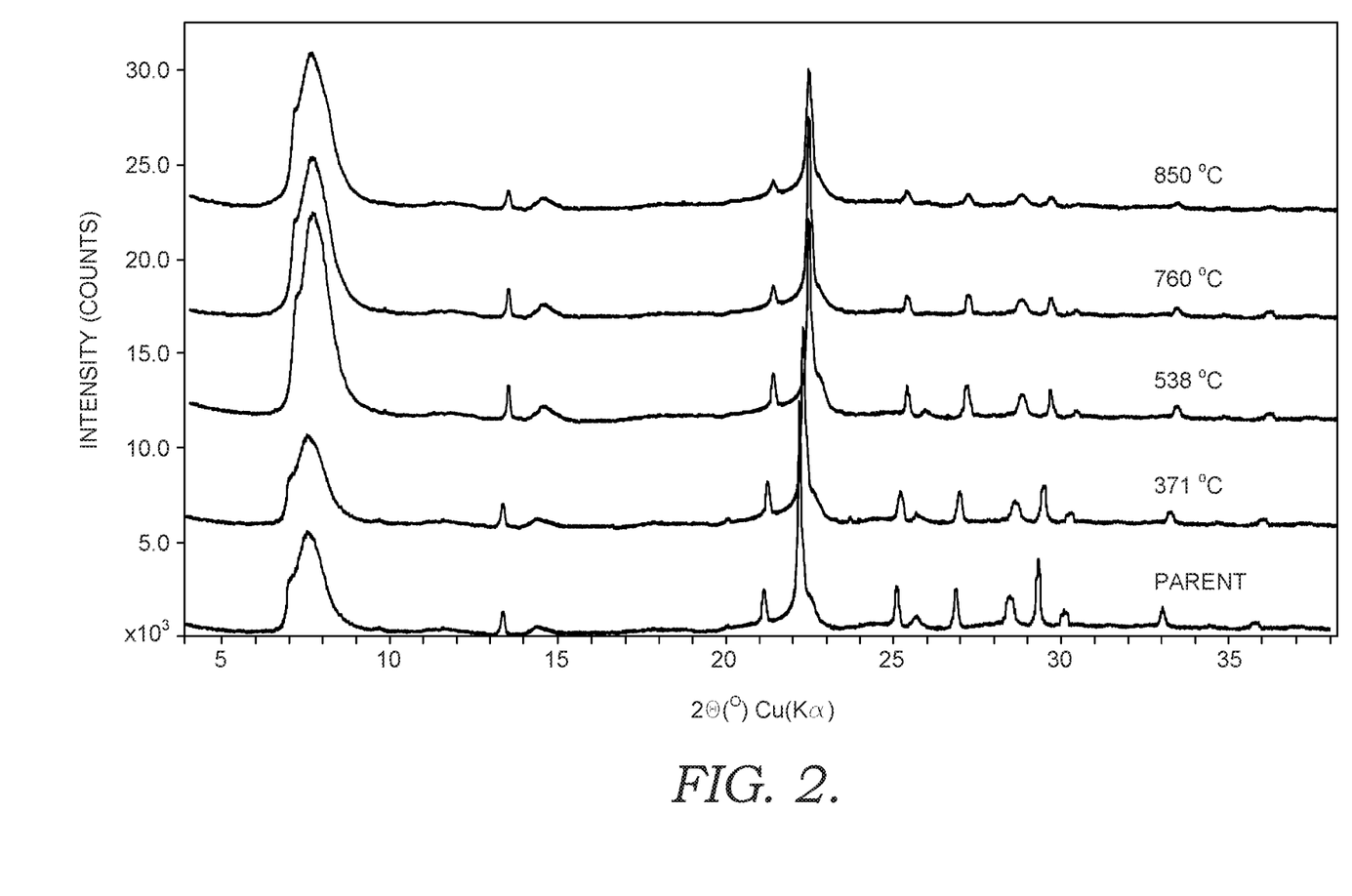
FIG. 2 powder X-ray diffraction data for zeolite Beta samples formed without use of a structure directing agent after various types of steaming.

FIG. 2 shows X-ray diffraction patterns for the zeolite Beta samples after steaming at temperatures of 371° C., 427° C., 538° C., 760° C., and 850° C. As shown in FIG. 2, the zeolite Beta samples maintained good crystallinity at temperatures up to 760° C. At 850° C., there is some reduction in the peak intensities in the mid-angle region. This indicates that X-ray diffraction data alone does not provide a strong indication of the amount of structural dealumination caused by steaming.

Table 3 shows Alpha values, surface areas, and micropore volumes for the steamed zeolite Beta samples in FIGS. 1 and 2. As shown in Table 3, the zeolite Beta formed without using an organic structure directing agent maintains a higher Alpha value after steaming than the conventional Beta samples from Example 1. For example, after steaming at 760° C., the zeolite Beta formed without using an organic structure directing agent had an Alpha value of 88, as opposed to the Alpha values of less than 5 for the conventional zeolite Beta samples shown in Table 1. Relatively high surface areas and micropore volume are also maintained after steaming at all of the temperatures shown in Table 1. The results in FIG. 1, FIG. 2, and Table 3 indicate that zeolite Beta formed without the use of a structure directing agent can provide improved hydrothermal stability, but still further stability is needed for use in a commercial reaction environment, such as a fluid catalytic cracking process.

TABLE 3

Characterization of Zeolite Beta Samples
(No Structure Directing Agent)

| Steam Temp (° C.) | Alpha | BET (m$^2$/g) | Micropore volume (cm$^3$/g) |
|---|---|---|---|
| Parent (no steam) | 1300 | 702 | 0.27 |
| 371 | 710 | 670 | 0.24 |
| 427 | 790 | 589 | 0.205 |
| 538 | 620 | 542 | 0.19 |
| 760 | 88 | 507 | 0.17 |
| 850 | 12 | 370 | 0.13 |

Example 3—Stability of La-Exchanged Zeolite Beta

Zeolite Beta crystals formed without the use of an organic structure directing agent were exposed to ion exchange conditions to form lanthanum-exchanged zeolite Beta. The La-exchanged zeolite Beta was formed by exchanging 25 g of the zeolite Beta (ammonium form) in 375 mL of a 0.25M La(NO$_3$)$_3$ solution in steam. After exchange, the La-exchanged Beta included 10.6 wt % of La, as determined by energy dispersive X-ray spectroscopy (EDS).

Samples of the La-exchanged Beta were then characterized after steaming at various temperatures ranging from 371° C. to 760° C., in a manner similar to the characterization in Example 2. For each test condition, roughly 4 grams of La-exchanged zeolite Beta was pelletized and loaded into a vertical quartz-tube reactor. The La-exchanged zeolite was then heated at 5° C. per minute to reach the desired temperature. During the initial heating, the zeolite was heated under a flow of nitrogen gas. After reaching the desired temperature, water was dripped from the top of the reactor into the heated bed at a rate of roughly 5 cm$^3$ per hour. The steaming was continued for 16 hours. The steamed zeolite was then cooled. The steamed zeolite samples were characterized using $^{27}$Al-NMR and powder X-ray diffraction. The steamed zeolite samples were also characterized using the Alpha test and nitrogen physisorption.

Figure 3:
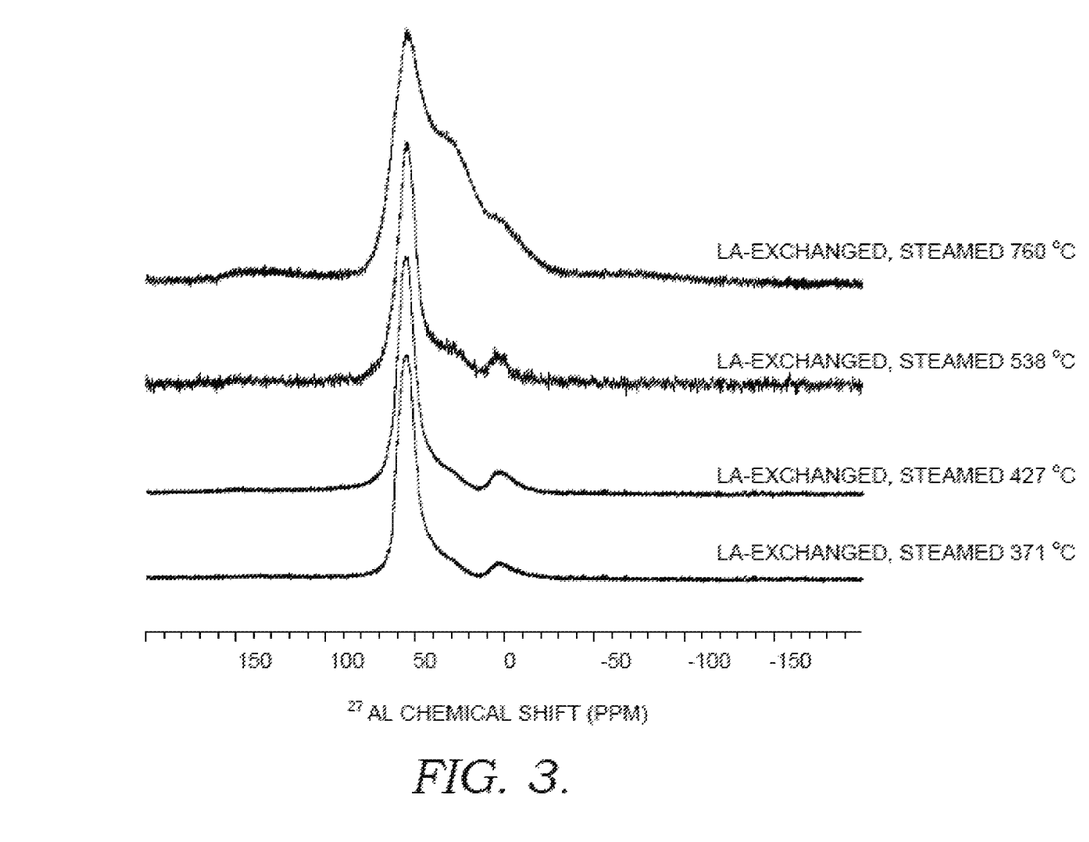
FIG. 3 shows $^{27}$Al-NMR data for La-exchanged zeolite Beta samples formed without use of a structure directing agent after various types of steaming.

FIG. 3 shows the $^{27}$Al-NMR spectra for the La-exchanged zeolite Beta samples after steaming at temperatures of 371° C., 427° C., 538° C., and 760° C. As shown in FIG. 3, 80% or more of the aluminum remains in tetrahedral positions at all of the temperatures that were studied. At temperatures of 371° C. and 427° C., only a minor octahedral aluminum peak (near 0 ppm) was present. A shoulder potentially indicating the presence of pentahedral aluminum appeared at 538° C., but even at 760° C. the pentahedral peak was not distinct. This is in contrast to the zeolite Beta without La-exchange, in which 50% or more of the aluminum was converted to non-tetrahedral aluminum at temperatures of 427° C. or more. As a further contrast, for the zeolite Beta without La-exchange, the pentahedral aluminum peak was clearly present at 538° C. Overall, the data in FIG. 3 indicate that La-exchanged zeolite Beta has a substantial and unexpected improvement in structural stability in a hydrothermal processing environment. In particular, it is believed that the ability to retain a substantially higher portion of the aluminum in framework locations (i.e., tetrahedral locations) is correlated with maintenance of structural stability over time. The powder X-ray diffraction data showed good crystallinity for all steaming conditions.

Table 4 shows Alpha values, surface areas, and micropore volumes for the La-exchanged steamed zeolite Beta samples in FIG. 3. As shown in Table 4, the Alpha value, surface area, and micropore volume of the La-exchanged zeolite Beta were lower prior to steaming than the corresponding zeolites without La exchange (see Table 3). For surface area and micropore volume, the rate of decrease for the La-exchanged samples relative to increases in the steaming temperature was comparable to the rate of decrease for the non-exchanged samples. Thus, based on surface area and micropore volume, the La-exchanged samples appeared to have comparable activity to the non-exchanged samples, with the benefit of greater structural stability as shown in FIG. 3. One apparent difference is that the Alpha values of the La-exchanged samples were lower. However, it is believed that the difference in Alpha values between Table 3 and Table 4 was due in part to the decrease in hydration levels of lanthanum as the samples were exposed to increasingly higher temperatures, and not to loss of acidity due to dealumination.

To further investigate the cause for the difference in Alpha values for the La-exchanged samples, after steaming at 760° C. for 16 hours, the 760° C. sample was ion exchanged with an ammonium nitrate solution at 98° C. The resulting $NH_4^+$ exchanged sample had an Alpha value of 43, rather than 12 prior to the ammonia exchange. The Alpha value after the ammonia exchange is believed to be more representative of the activity that the La-exchanged catalyst would have in a hydrothermal processing environment. It is believed that performing ammonia exchange on the other La-exchanged samples after steaming would have a similar effect of reducing the difference in Alpha value between the La-exchanged samples and the non-exchanged samples. Thus, based on FIG. 3 and Table 4, the La-exchange zeolite Beta samples appear to have substantially improved stability under hydrothermal processing conditions while still retaining sufficient activity to serve as a cracking catalyst. It is noted that even after ammonia exchange, the Alpha value of the La-exchanged zeolite Beta in Table 4 was still lower than the corresponding unexchanged sample in Table 1.

TABLE 4

Characterization of La-Exchanged Zeolite Beta Samples

| Steam Temp (° C.) | Alpha | BET ($m^2/g$) | Micropore volume ($cm^3/g$) |
| --- | --- | --- | --- |
| Parent (no steam) | 520 | 617 | 0.23 |
| 371 | 400 | 553 | 0.21 |
| 427 | 380 | 503 | 0.19 |
| 538 | 250 | 442 | 0.15 |
| 760 | 12 | 373 | 0.13 |
| 760, $NH_4^+$ | 43 | | |

Comparative Example 4—Stability of Al-Exchanged Zeolite Beta

The typical valence state for rare earth elements when forming an oxide or another ionic compound is considered to be +3. Aluminum also typically has a +3 valence state in oxides. To determine if aluminum exchange could provide similar benefits to rare earth exchange, additional samples of zeolite Beta were ion exchanged using aluminum nitrate solution, in a manner similar to the ion exchange described in Example 3. Based on EDS analysis, the ion exchange resulted in near-stoichiometric exchange of aluminum for ammonium in the zeolite beta sample. This reduced the ratio of silicon to aluminum in the zeolite beta sample from roughly 4.9 to roughly 3.7. After the aluminum exchange, steaming was performed at 538° C. and 760° C., in a manner similar to Example 3.

Figure 4:
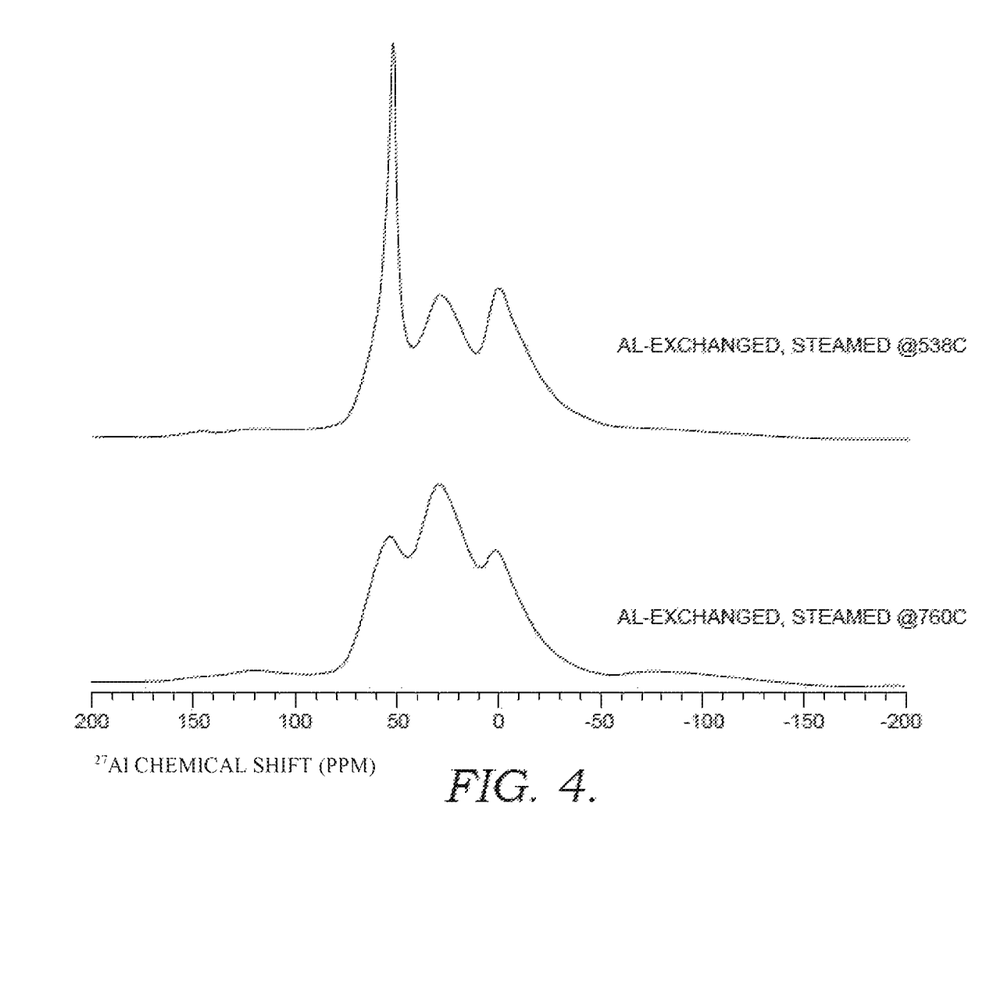
FIG. 4 shows $^{27}$Al-NMR data for Al-exchanged zeolite Beta samples formed without use of a structure directing agent after various types of steaming.

FIG. 4 shows shows the $^{27}$Al-NMR spectra for the Al-exchanged zeolite Beta samples after steaming at temperatures of 538° C. and 760° C. The spectra in FIG. 4 show that steaming of the Al-exchanged zeolite Beta caused conversion of tetrahedral aluminum to non-tetrahedral aluminum, resulting in spectra similar to those shown in FIG. 1. Thus, aluminum did not appear to provide the same stabilizing benefit as a rare earth element with regard to preserving tetrahedral alumina. It is noted that the powder X-ray diffraction data showed good crystallinity for all steaming conditions, similar to the non-exchanged zeolite Beta.

Table 5 shows Alpha values, surface areas, and micropore volumes for the Al-exchanged steamed zeolite Beta samples in FIG. 4. As shown in Table 5, the Al-exchanged steamed zeolite Beta samples had lower values for Alpha value, BET surface area, and micropore volume as compared to the non-exchanged samples in Table 3. Thus, it appears that steaming of the Al-exchanged zeolite Beta samples resulted in conversion of tetrahedral aluminum to non-tetrahedral aluminum, similar to the non-exchanged sample, while also having lower activity.

TABLE 5

Characterization of Al-Exchanged Beta Zeolite Samples

| Steam Temp (° C.) | Alpha | BET ($m^2/g$) | Micropore volume ($cm^3/g$) |
| --- | --- | --- | --- |
| Parent (no steam) | 1100 | 645 | 0.25 |
| 538 | 360 | 531 | 0.19 |
| 760 | 18 | 440 | 0.15 |

Example 5—Phosphorus Modification of Zeolite Beta

Samples of zeolite Beta were modified to include roughly 2.3 wt % of phosphorus according to the following procedure. 12 grams of zeolite Beta (formed without use of a structure directing agent) were heated overnight in an oven at 80° C. A solution of phosphoric acid was prepared by diluting 0.99 g of 87% $H_3PO_4$ to 2.5 g using deionized water. The solution was then added to the 12 g of zeolite Beta using incipient wetness. The phosphorus-modified zeolite was dried overnight in an oven at 80° C. The phosphorus-modified material was then calcined in air at 540° C. for 12 hours. The calcined material was then steamed to temperatures of 538° C., 760° C., or 850° C. for 16 hours. An additional phosphorus-modified sample was also prepared using a similar methodology, but with a nominal phosphorus content of 3.5 wt %. The 3.5 wt % phosphorus-modified zeolite was subsequently steamed at 760° C. for 16 hours.

Figure 5:
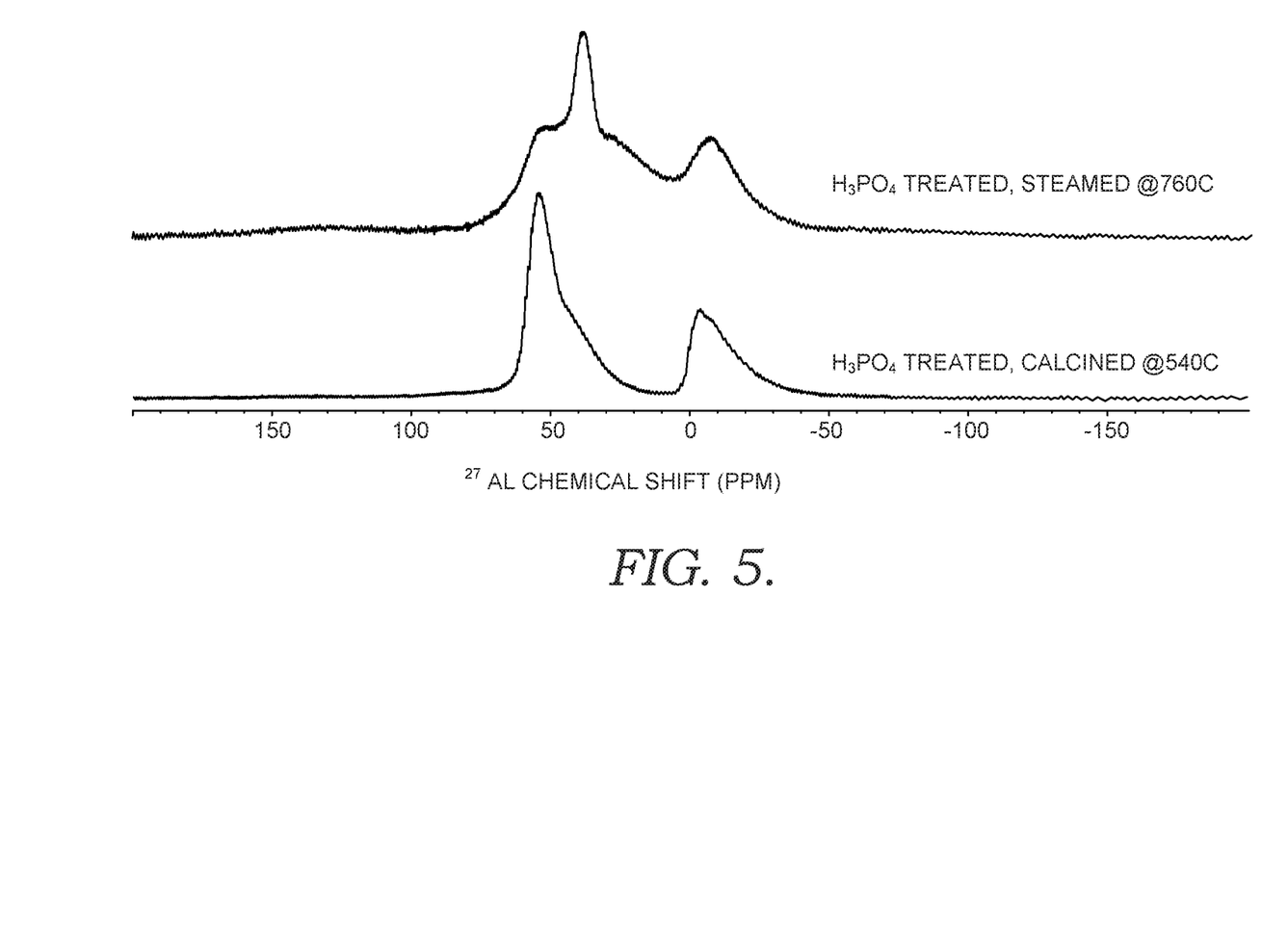
FIG. 5 shows $^{27}$Al-NMR data for P-modified zeolite Beta samples formed without use of a structure directing agent after various types of steaming.

FIG. 5 shows the $^{27}$Al-NMR spectra for the 2.3 wt % phosphorus-modified samples. In FIG. 5, one sample that is shown is a sample that was exposed to the calcination at 540° C. only, without further exposure to steam. The other sample corresponds to a sample that was steamed at 760° C. after the calcination at 540° C. As shown in FIG. 5, the sample treated with phosphorus and then calcined at 540° C. has roughly a third non-tetrahedral Al, as indicated by the peak intensity near 0 ppm. The treatment with the acid results in dealumination, but (as shown by the spectrum of the sample at 760° C.) much of the remaining tetrahedral aluminum stays tetrahedral after steaming at high temperatures. Comparison with FIG. 1 shows that after steaming to 760° C., a significantly larger portion of aluminum remains tetrahedral compared to the untreated sample, with a distinct peak centered around 38 ppm.

Figure 6:
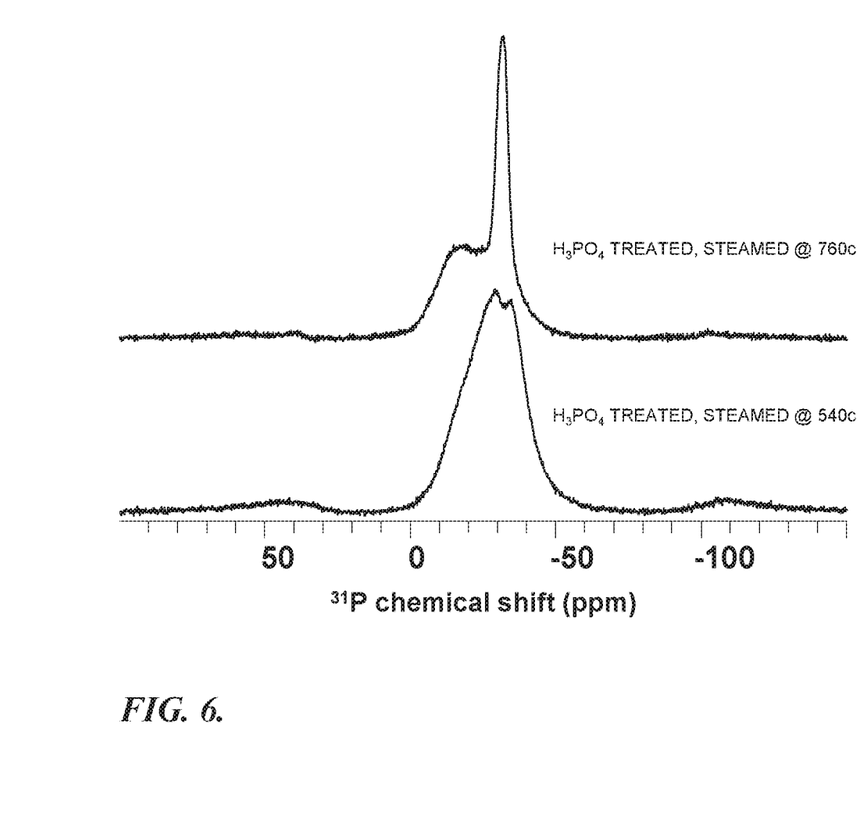
FIG. 6 shows $^{31}$P-NMR data for P-modified zeolite Beta samples formed without use of a structure directing agent after various types of steaming.

The peak centered around 38 ppm is consistent with Al species present in AlPO and SAPO type materials. Without being bound by any particular theory, it is believed that the peak centered around 38 ppm is an indication that such AlPO and/or SAPO type species are being formed in the phosphorus-modified samples. To further investigate this, the samples shown in FIG. 5 were also characterized using $^{31}$P-NMR. As shown in FIG. 6, the peak at roughly −32 ppm in the $^{31}$P-NMR spectra is consistent with a phosphorus species in a tetrahedral environment, which further indicates the presence of AlPO and/or SAPO species in the phosphorus-modified samples.

Table 6 shows Alpha values, surface areas, and micropore volumes for the P-modified steamed zeolite Beta samples described in this example. As shown in Table 6, modification of the zeolite to include 2.3 wt % phosphorus resulted in an initial (unsteamed) sample with lower Alpha value, surface area, and micropore volume than an unmodified sample. However, after steaming at 538° C. or 760° C., the phosphorus modified sample maintained unexpectedly high Alpha values, including an Alpha value of 190 after steaming for 16 hours at 760° C. By contrast, an unmodified sample (as shown in Table 3) had an Alpha value of 88 after steaming at 760° C. Although the surface area and micropore volume show some reduction, the unexpectedly high Alpha value indicates that phosphorus modification can provide increased catalytic activity for zeolite exposed to a hydrothermal processing environment. It is noted that further addition of phosphorus does not appear to be as beneficial, as the 3.5 wt % P-modified sample had lower Alpha value, surface area, and micropore volume after steaming relative to the 2.3 wt % P-modified sample. Thus, modification of the hydrothermally stabilized zeolite Beta with phosphorus appeared to have both some benefit for maintaining Al in tetrahedral locations, as shown in FIG. 5, while also having some benefit for increasing the activity of the resulting catalyst, as shown by the Alpha values in Table 6. Without being bound by any particular theory, the stability and/or activity benefits from phosphorus modification may be due to the formation of AlPO and/or SAPO species.

TABLE 6

Characterization of P-Modified Beta Zeolite Samples

| Steam Temp (° C.) | Alpha | BET (m²/g) | Micropore volume (cm³/g) |
|---|---|---|---|
| Parent (no steam) | 700 | 514 | 0.19 |
| 538 | 930 | 473 | 0.17 |
| 760 | 190 | 415 | 0.15 |
| 850 | 12 | 285 | 0.105 |
| 760 (3.5 wt % P) | 130 | 302 | 0.105 |

Additional Embodiments

Embodiment 1

A method for performing cracking of hydrocarbons under hydrothermal processing conditions, comprising: contacting a feed comprising hydrocarbons with a catalyst comprising hydrothermally stabilized zeolite Beta under hydrothermal processing conditions to form a process effluent, the hydrothermal processing conditions comprising a temperature of 475° C. or more in the presence of steam, wherein the hydrothermally stabilized zeolite Beta is stabilized with 0.5 wt % or more of a lanthanide series element, phosphorus, or a combination thereof.

Embodiment 2

The method of Embodiment 1, wherein the hydrothermally stabilized zeolite Beta is stabilized with lanthanum, phosphorus, or a combination thereof.

Embodiment 3

The method of any of the above embodiments, wherein the hydrothermally stabilized zeolite Beta is stabilized with 1.0 wt % to 15 wt % of lanthanum, or wherein the catalyst is stabilized with 1.0 wt % to 15 wt % of a lanthanide series element.

Embodiment 4

The method of Embodiment 3, wherein the framework of the hydrothermally stabilized zeolite Beta comprises 70% or more tetrahedrally coordinated alumina after exposure to the hydrothermal processing conditions for 24 hours or more.

Embodiment 5

The method of Embodiment 3 or 4, wherein the catalyst has an Alpha value of 100 or less after exposure to the hydrothermal processing conditions for 24 hours or more.

Embodiment 6

The method of Embodiment 1 or 2, wherein the hydrothermally stabilized zeolite Beta is stabilized with 0.5 wt % to 2.5 wt % phosphorus.

Embodiment 7

The method of Embodiment 6, wherein the catalyst has an Alpha value of 500 or more after exposure to the hydrothermal processing conditions for 24 hours or more.

Embodiment 8

The method of any of the above embodiments, wherein the hydrothermally stabilized zeolite Beta comprises a polymorph of zeolite Beta.

Embodiment 9

The method of any of the above embodiments, wherein the hydrothermally stabilized zeolite Beta comprises zeolite Beta formed without the use of a structure directing agent, or wherein the hydrothermally stabilized zeolite Beta comprises zeolite Beta formed using seed crystals, or a combination thereof.

Embodiment 10

The method of any of the above embodiments, wherein the hydrothermal processing conditions comprise fluid catalytic cracking conditions.

Embodiment 11

The method of any of the above embodiments, the method further comprising exposing the catalyst to regeneration conditions comprising a temperature of 700° C. or more.

Embodiment 12

The method of any of the above embodiments, wherein the catalyst further comprises a binder.

Embodiment 13

The method of any of the above embodiments, wherein the hydrothermally stabilized zeolite Beta is stabilized with the lanthanide series element, phosphorus, or a combination thereof by ion exchange.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for performing cracking of hydrocarbons under hydrothermal processing conditions, comprising:
    contacting a feed comprising hydrocarbons with a catalyst comprising at least one of hydrothermally stabilized zeolite Beta and a hydrothermally stabilized polymorph of zeolite Beta under hydrothermal processing conditions to form a process effluent, the hydrothermal processing conditions comprising a temperature of 475° C. or more in the presence of steam,
    wherein the at least one of hydrothermally stabilized zeolite Beta and a hydrothermally stabilized polymorph of zeolite Beta is stabilized with 0.5 wt % or more of a lanthanide series element, phosphorus, or a combination thereof.

2. The method of claim 1, wherein the at least one of hydrothermally stabilized zeolite Beta and a hydrothermally stabilized polymorph of zeolite Beta is stabilized with lanthanum, phosphorus, or a combination thereof.

3. The method of claim 1, wherein the at least one of hydrothermally stabilized zeolite Beta and a hydrothermally stabilized polymorph of zeolite Beta is stabilized with 1.0 wt % to 15 wt % of lanthanum.

4. The method of claim 3, wherein the framework of the at least one of hydrothermally stabilized zeolite Beta and a hydrothermally stabilized polymorph of zeolite Beta comprises 70% or more tetrahedrally coordinated alumina after exposure to the hydrothermal processing conditions for 24 hours or more.

5. The method of claim 3, wherein the catalyst has an Alpha value of 100 or less after exposure to the hydrothermal processing conditions for 24 hours or more.

6. The method of claim 1, wherein the at least one of hydrothermally stabilized zeolite Beta and a hydrothermally stabilized polymorph of zeolite Beta is stabilized with 0.5 wt % to 2.5 wt % phosphorus.

7. The method of claim 6, wherein the catalyst has an Alpha value of 500 or more after exposure to the hydrothermal processing conditions for 24 hours or more.

8. The method of claim 1, wherein the catalyst comprises a hydrothermally stabilized polymorph of zeolite Beta.

9. The method of claim 1, wherein the hydrothermally stabilized zeolite Beta comprises zeolite Beta formed using seed crystals.

10. The method of claim 1, wherein the hydrothermal processing conditions comprise fluid catalytic cracking conditions.

11. The method of claim 1, the method further comprising exposing the catalyst to regeneration conditions comprising a temperature of 700° C. or more.

12. The method of claim 1, wherein the catalyst further comprises a binder.

13. The method of claim 1, wherein the at least one of hydrothermally stabilized zeolite Beta and a hydrothermally stabilized polymorph of zeolite Beta is stabilized by modifying the at least one of hydrothermally stabilized zeolite Beta and a hydrothermally stabilized polymorph of zeolite Beta with the lanthanide series element, phosphorus, or a combination thereof by ion exchange.

14. A method for performing cracking of hydrocarbons under hydrothermal processing conditions, comprising:
    contacting a feed comprising hydrocarbons with a catalyst comprising at least one of hydrothermally stabilized zeolite Beta and a hydrothermally stabilized polymorph of zeolite Beta under hydrothermal processing conditions to form a process effluent, the hydrothermal processing conditions comprising a temperature of 475° C. or more in the presence of steam,
    wherein the at least one of hydrothermally stabilized zeolite Beta and a hydrothermally stabilized polymorph of zeolite Beta is stabilized with 1.0 wt % to 15 wt % of a lanthanide series element.

15. The method of claim 14, wherein the at least one of hydrothermally stabilized zeolite Beta and a hydrothermally stabilized polymorph of zeolite Beta is stabilized with 1.0 wt % to 15 wt % of lanthanum.

16. The method of claim 14, wherein the catalyst comprises a hydrothermally stabilized polymorph of zeolite Beta.

17. The method of claim 14, wherein the hydrothermal processing conditions comprise fluid catalytic cracking conditions.

18. The method of claim 14, the method further comprising exposing the catalyst to regeneration conditions comprising a temperature of 700° C. or more.

* * * * *